United States Patent
Mustafi et al.

(10) Patent No.: US 12,348,499 B2
(45) Date of Patent: Jul. 1, 2025

(54) SECURE COLLABORATION WITH FILE ENCRYPTION ON DOWNLOAD

(71) Applicant: MICROSOFT TECHNOLOGY LICENSING, LLC, Redmond, WA (US)

(72) Inventors: Sanjoyan Mustafi, Redmond, WA (US); Aashish Ramdas, Seattle, WA (US); Pradeep Kamalakumar, Hyderabad (IN); Abhijit Pal, Hyderabad (IN); Ayal Ofer Laleh, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 577 days.

(21) Appl. No.: 17/678,948

(22) Filed: Feb. 23, 2022

(65) Prior Publication Data
US 2023/0269239 A1    Aug. 24, 2023

(51) Int. Cl.
G06F 21/62     (2013.01)
H04L 9/40     (2022.01)

(52) U.S. Cl.
CPC ...... *H04L 63/0435* (2013.01); *G06F 21/6209* (2013.01); *H04L 63/102* (2013.01);
(Continued)

(58) Field of Classification Search
CPC ......... G06F 21/6209; G06F 2221/2141; G06F 2221/2147
See application file for complete search history.

(56) References Cited

U.S. PATENT DOCUMENTS

| 7,269,854 B2 | 9/2007 | Simmons et al. |
| 7,660,902 B2 | 2/2010 | Graham et al. |

(Continued)

FOREIGN PATENT DOCUMENTS

| CN | 103780581 A | 5/2014 |
| CN | 107204973 A | 9/2017 |
| WO | 2016131044 A1 | 8/2016 |

OTHER PUBLICATIONS

Bailey, et al., "Enable Sensitivity Labels for Office Files in SharePoint and OneDrive", Retrieved From: https://docs.microsoft.com/en-us/microsoft-365/compliance/sensitivity-labels-sharepoint-onedrive-files?view=o365-worldwide, Dec. 9, 2021, 13 Pages.

(Continued)

*Primary Examiner* — David J Pearson
(74) *Attorney, Agent, or Firm* — Newport IP, LLC; Jacob P. Rohwer

(57) ABSTRACT

The techniques disclosed herein enable systems to manage remote file storage systems while bolstering information security through file encryption on download and permissions labels. To achieve this, a site owner configures permissions for a network site that stores files and that enables encryption on download. Various users with file access via the permissions may then interact with the site. When a user downloads a file from the site, they receive an encrypted copy that includes a permissions label that synchronizes with the network site permissions. When a user attempts to interact with an encrypted file the permissions label is used by the system to determine whether the user is authorized to access the file. In addition, permissions that are changed at the network site can be propagated to downloaded encrypted copies. In this way, permissions can be enforced for all site files even when copies leave the network site.

17 Claims, 10 Drawing Sheets

(52) U.S. Cl.
CPC ...... *H04L 63/20* (2013.01); *G06F 2221/2141* (2013.01); *G06F 2221/2147* (2013.01)

(56) References Cited

U.S. PATENT DOCUMENTS

| | | | |
|---|---|---|---|
| 7,743,427 B2 | 6/2010 | Byrne et al. | |
| 9,270,733 B2 | 2/2016 | Ruppert et al. | |
| 2002/0077986 A1 | 6/2002 | Kobata et al. | |
| 2005/0097441 A1* | 5/2005 | Herbach | G06F 21/10 |
| | | | 715/229 |
| 2012/0198559 A1* | 8/2012 | Venkata Naga Ravi | |
| | | | G06F 21/62 |
| | | | 726/26 |
| 2014/0032900 A1* | 1/2014 | Donahue | G06F 21/6209 |
| | | | 713/193 |
| 2014/0082071 A1* | 3/2014 | Rexer | G06F 16/192 |
| | | | 709/204 |
| 2015/0127937 A1* | 5/2015 | Ali | H04L 67/02 |
| | | | 713/165 |
| 2015/0213284 A1* | 7/2015 | Birkel | G06F 21/6218 |
| | | | 726/30 |
| 2016/0182465 A1* | 6/2016 | Lám | H04L 63/123 |
| | | | 713/171 |
| 2017/0200122 A1* | 7/2017 | Edson | H04L 63/104 |
| 2017/0286711 A1* | 10/2017 | Negrea | H04L 63/10 |
| 2018/0025025 A1 | 1/2018 | Davis et al. | |
| 2018/0062852 A1* | 3/2018 | Schmahmann | G06Q 10/101 |
| 2020/0175185 A1* | 6/2020 | Dalal | G06F 21/604 |
| 2021/0344485 A1 | 11/2021 | Levin et al. | |
| 2022/0092026 A1* | 3/2022 | Rice | H04L 67/306 |

OTHER PUBLICATIONS

Khanezaei, et al., "A Framework Based on RSA and AES Encryption Algorithms for Cloud Computing Services", In Proceedings of IEEE Conference on Systems, Process and Control, Dec. 12, 2014, pp. 58-62.

"International Search Report and Written Opinion Issued in PCT Application No. PCT/US22/050993", Mailed Date: Feb. 17, 2023, 10 Pages.

* cited by examiner

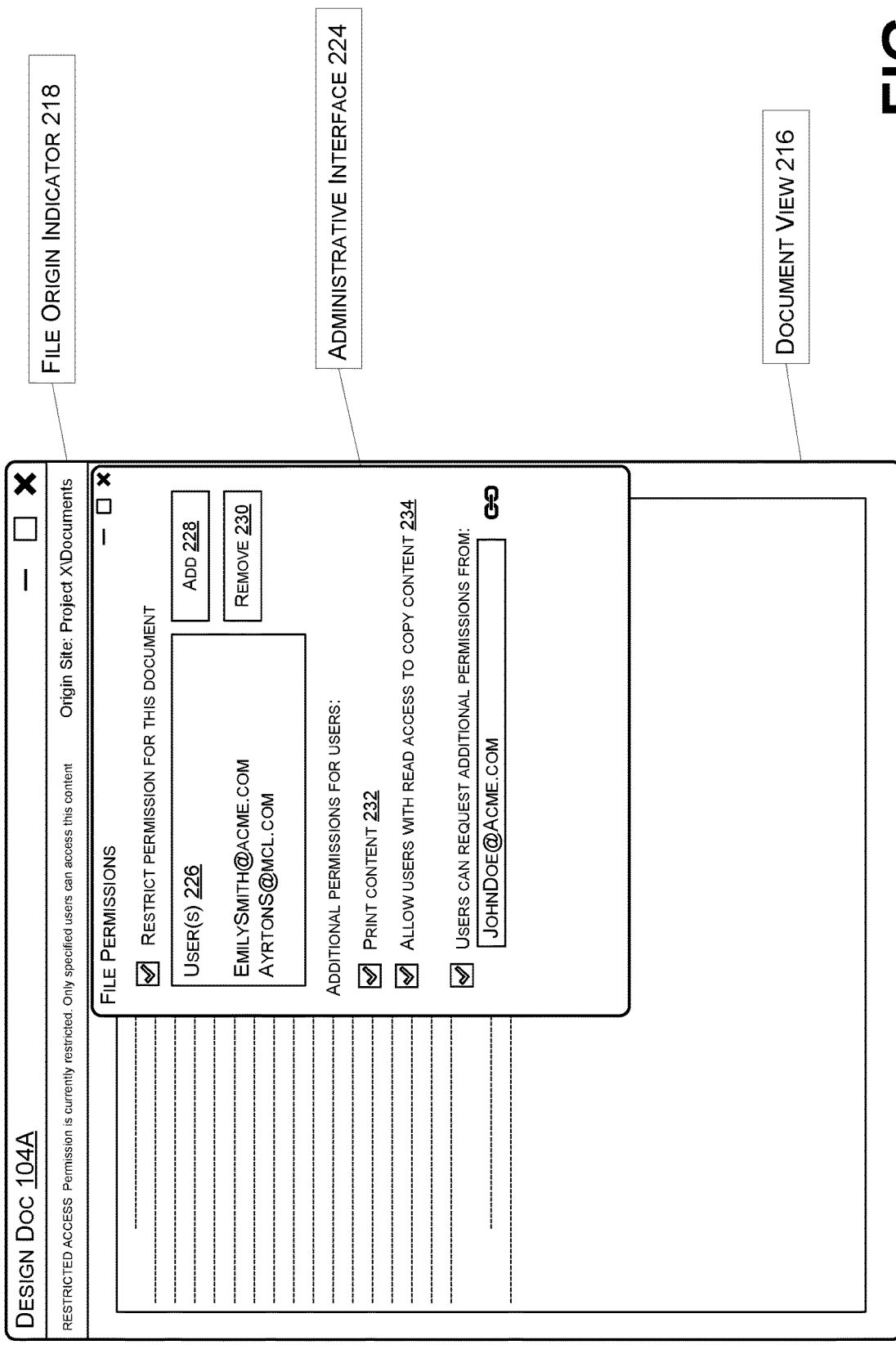

SECURE COLLABORATION WITH FILE ENCRYPTION ON DOWNLOAD

BACKGROUND

As remote work grows in popularity, demand for flexible collaboration platforms has increased accordingly. A key feature of many collaboration services is online file storage and control that enable groups of users to efficiently manage and collaborate on documents and other items remotely. One particularly popular approach to this is enabling a user to create a separate, and centralized, network location for a set of files related in some way. Conceptually, the network location is a known space to which a network service provider allocates resources so that the files can be accessed by a group of users. In this sense, the network location may be referred to as a site or a file library that can be accessed by a uniform resource locator (URL) or another sort of network location identifier, for example. In many scenarios, the files may be related because they belong to a same task or project (e.g., a work project, a school project, a home project, etc.). Accordingly, the files can include word processing documents, presentation documents (e.g., a slide deck), spreadsheet documents, whiteboard documents, images (e.g., photos), videos, diagrams, drawings, computer code, and so forth. A group of users that have an interest in the set of related files can use the network location to store the files so they can easily be accessed and viewed by other users in the group.

However, a drawback of the streamlined collaboration enabled by the aforementioned features (e.g., group collaboration, file sharing, centralized file storage) is the potential risk of a security breach in the event a file leaves the site and falls in to the possession of an unauthorized user. Stated another way, typical approaches to the administration of collaboration sites assume a level of trust between owners of a file and the various users of the site which can pose a security risk. These security risks are exacerbated when aspects of the project for which the files are stored are sensitive and/or confidential. For instance, an unscrupulous user may aim to leak sensitive information to competitors, malicious actors, and the like. As such, when the project includes sensitive and/or confidential aspects, the ability for users to download and view the content of the files stored in a network location needs to be limited and/or otherwise protected.

To prevent such breaches of security is to enable a file owner (e.g., an author) or other administrative entity to restrict access to the file through permissions. For instance, the author can specify a list of users that may view the content of a file, modify the content of the file, as well as other file control functionalities. However, this process involves several steps that must be performed manually and on a per-file basis. As such, many file owners forget to take the steps necessary to configure sensitive files with the proper permissions, thereby making the file susceptible to misuse by other users. Furthermore, some file owners do not forget but rather cannot spend the time necessary to properly secure such files.

In addition, even if the file owner expends the necessary effort to properly permission every file for a particular site, the permissions are often unenforceable in the event the file is downloaded or otherwise egresses the site. For example, many collaboration platforms enable users to download files from their original sites to enable work to be performed without a direct connection to the site. However, while such features increase the convenience of collaboration sites, they can also be exploited to exfiltrate sensitive or confidential information. Since the file is no longer within the jurisdiction of the site, the various permissions cannot be enforced. Accordingly, the contents of the file are now freely accessible to any user in possession of the downloaded copy.

Consequently, a security issue is more likely to occur when a file owner does not enable proper permissions for an individual file within a network site. In addition, permissions that are unenforceable outside the site are, of course, ineffective in preventing unauthorized access to downloaded copies of the file. For instance, a user working on a secretive business project may upload some files to a network site along with specific permissions as to which users are authorized to view and/or edit the file. Accordingly, one such authorized user may download the files from the network site and/or create copies of the files in a separate location out of the purview of the original network site. This other user may also unknowingly (or knowingly) share the files with users that would not have been able to access the content of the files had systems been in place to enforce the permissions regardless of file location.

It is with respect to these and other considerations that the disclosure made herein is presented.

SUMMARY

The techniques disclosed herein improve the functionality of systems for storing and managing files through the introduction of file encryption on download using robust permissions that are enforceable regardless of file location. Generally described, files that are related in some way (e.g., associated with a project) can be stored at a collaborative network site, enabling easy access to the files by a group of users. An owner of the file, e.g., the user that creates and/or administers the site, can enable encryption on download for the site or a portion of the site (e.g., a specific document library). When encryption on download is enabled, site permissions such as read and edit that govern user interaction with files can be included as part of the encrypted copy of the file that is downloaded. In this way, file permissions can be enforced even if the file egresses the collaborative network site thereby bolstering information security.

In various examples, a file that is stored at a collaborative network site can be configured with various permissions by an administrative entity. The administrative entity can be a user that originally authored the file, a user that administers the network site, or other entity with the authority to modify file permissions. Using the permissions, the administrative entity can specify a group of users that may access the file and actions that they may take such as printing or copying content. As mentioned above, the file can subsequently be downloaded by a user that was granted access to the file via the permissions. Accordingly, the user can receive an encrypted copy of the file that includes the file itself as well as a permissions label. As described herein, the content of the downloaded file can be encrypted using any suitable method with access to the content controlled by the permissions label. Moreover, the permissions label can specify certain users that are allowed, or authorized, to view and/or edit the content of the file among other actions.

While the user is in possession of the encrypted file, they may interact with the encrypted file as they would the file at the collaborative network site. That is, the user may view, edit, or otherwise use the file as allowed by their associated privileges in the permissions label. However, the administrative may revoke access to the file from the user. For example, the user may complete their responsibilities for a particular project and thus no longer require access to the files stored at the site. As such, the administrative entity can update the site permissions to remove the user from the list of users that may access the files. Accordingly, the user may no longer view or edit files stored at the network site. However, because the encrypted file the user previously downloaded includes a permissions label, the updated permissions can be enforced even though the encrypted file is not stored at the network site. In this example, the user can thus be prevented from accessing the encrypted file following the permission update.

In contrast to existing solutions, the disclosed system can realize the many benefits of remote file storage and control while bolstering information security to protect sensitive or confidential information. For instance, many existing solutions for remote file storage and management forgo security in favor of convenience. In a specific example, some solutions may not enforce any restrictions on what information users of a site can access enabling users to freely access all files stored on the site. These tradeoffs naturally make remote file solutions a poor choice for organizations that work with confidential or sensitive information thereby hampering productivity and flexibility.

However, even in some solutions that enable site permissions to limit access to various files, such permissions may be unenforceable when a copy of the file is downloaded from the site. For example, in a typical system, a user that is authorized to access the file may download a copy of the file and continue to access the content of that file even if their site permissions are revoked. In another example, the user may distribute the copy to unauthorized users by uploading the copy to another network site. In this example, since the unauthorized users are not accessing the file at the site, the permissions cannot be enforced against them. In contrast, the disclosed techniques can encrypt the downloaded copy of the file with a permissions label that can enable the system to enforce file permissions outside the collaborative network site and even within other network sites.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2C illustrates an example administrative interface in which an administrative entity can manage permissions for a particular file.

DETAILED DESCRIPTION

Figure 1A:
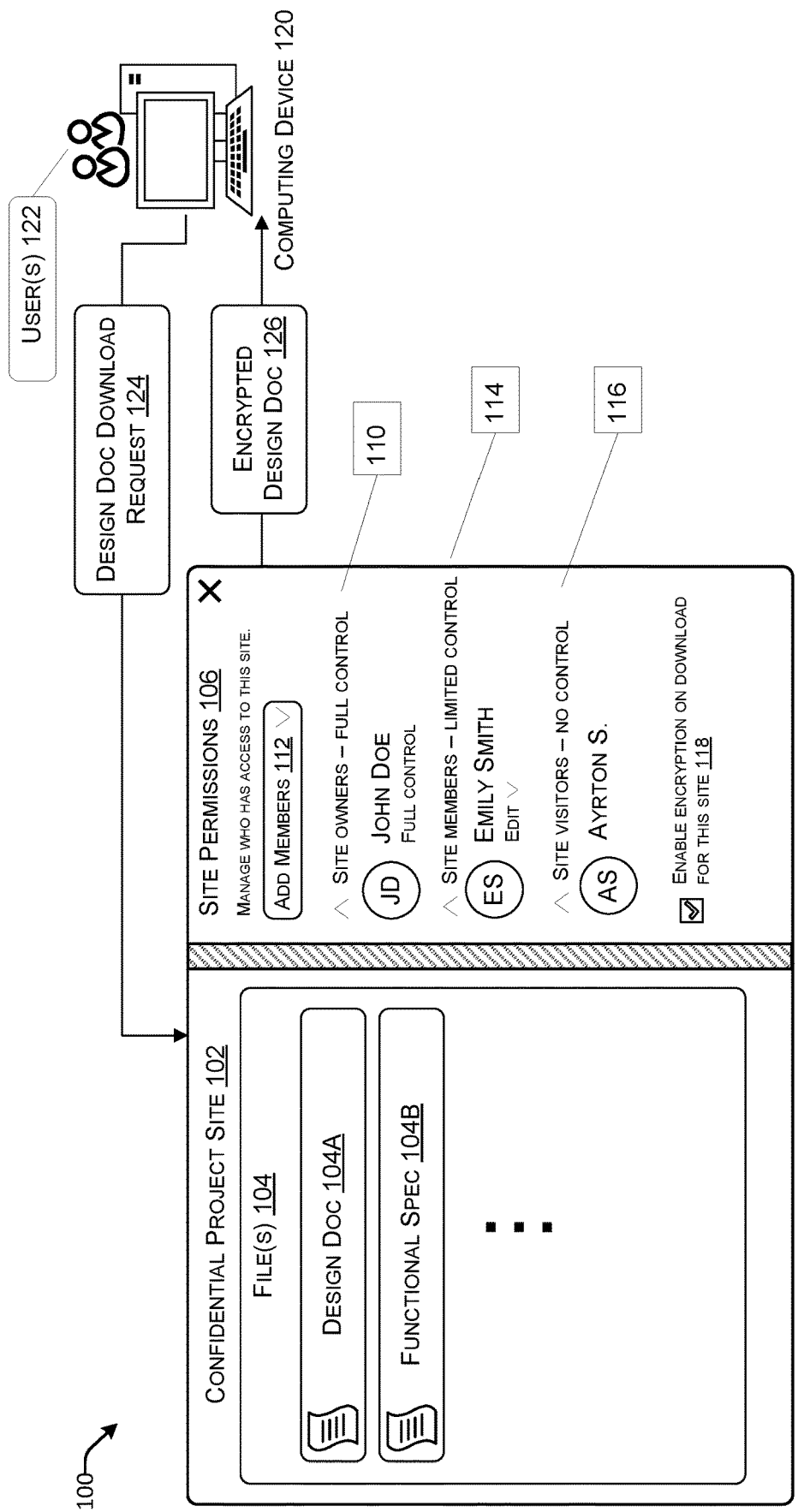
FIG. 1A is illustrates an example environment in which a system is configured to encrypt files on download and enforce permissions for downloaded files.

The techniques described herein provide systems for enhancing the operation of remote file storage and control platforms through file encryption on download with a permissions label. As mentioned above, a collaborative network site can be created to store files that are related in some way (e.g., files that are all associated with a work project). An owner of the network site, e.g., a user that creates and/or administers the network site, can define site permissions that authorize various users to access and interact with the files. Site permissions can be applied be applied at various granularities such as individual files, groups of files, portions of the site, or the entire network site.

The disclosed system addresses several technical challenges associated with maintaining information security while enabling collaboration through remote file storage. For example, some existing collaboration platforms can be configured with site permissions that govern user access to a collaborative network site. However, these platforms ultimately must assume a certain level of trust between the users and the site owner as permissions may not be enforceable for files that are downloaded or otherwise leave the site. Stated another way, while a file may be secure at the network site in some existing platforms, the same guarantee cannot be made for downloaded copies of the file. As such, this uncertainty can represent an unacceptable security risk for teams or organizations that work with confidential or sensitive information.

In contrast, the disclosed system can guarantee that downloaded copies of the file are subject to the same permissions as the original file at the collaborative network site through the permissions label. For example, when a user downloads a file from the collaborative network site, the content of the file can be encrypted such that the content is inaccessible to unauthorized users. Accordingly, access to the file can be controlled by the permissions label. The permissions label can define a specific group of users that are authorized to view, modify, or otherwise interact with the file. In various examples, the system may dynamically update the permissions label to synchronize with the site permissions defined by the site owner. In this way, the site permissions can be enforced for copies of files that egress the collaborative network site.

Furthermore, the disclosed system can greatly streamline human interaction with file collaboration platforms by providing a "one-click" method to automatically secure hundreds or even thousands of files. For example, a large network site may contain thousands of individual files. In some existing solutions, if information security is a high priority, an administrative entity such as the site owner must manually configure offline permissions for each file. At large scales such a task becomes unrealistic for one or even many individuals and may hamper productivity for users working on the site. Therefore, by automating this process, the disclosed system can enhance information security without impacting collaboration.

Various examples, scenarios, and aspects that enable secure collaboration through file encryption on download, are described below with reference to FIGS. 1-7.

FIG. 1A is a diagram illustrating an example environment 100 in which a confidential project site 102 stores various files 104 such as a design doc 104A and a functional spec 104B. As discussed above, access to the various files 104 stored at the confidential project site 102 can be governed by permissions 106. Within the permissions 106, the various members of the site 102 can be organized into groups and assigned privileges accordingly. For example, a user (e.g., John Doe) may have created the confidential project site 102 and can be accordingly designated as a site owner 110. In another example, a site owner 110 may not have created the site 102 itself but be appointed as a site owner 110. Site owners 110 can exercise full control over the confidential project site 102 such as modifying permissions 106, adding members 112, managing files 104 and so forth. In contrast, site members 114 may lack some of the privileges of the site owners 110 and/or be restricted from accessing some functionality. For instance, as will be elaborated upon below, the site members 114 may be restricted by site owners 110 to merely viewing the content of files 104 and not editing. Furthermore, the confidential project site 102 can host site visitors 116 who possess even further restricted permissions than site members 114. In one example, a site visitor 116 may be added to the site 102 to work on a particular file 104B. As such, the site visitor 116 may be authorized by a site owner 110 to access the file 104B while being restricted from any site permissions 106. In other words, the site visitor 116 may not interact with any other files 104 outside the file 104B they are working on.

Moreover, the site permissions 106 can also include an option to enable encryption on download 118 for the confidential project site 102. As mentioned above, this option 118 may provide the "one-click" solution for securing all files 104 that are stored in a site 102. In various examples, the encryption on download option 118 may only be accessible to site owners 110 and not site members 114 or site visitors 116, e.g., the option 118 is hidden in the user interface for site members 114 and site visitors 116. In the example of FIG. 1A, the confidential project site 102 stores a single set of files 104. In other configurations, the confidential project site 102 may be organized into several sets of files 104 or libraries. In another example, a large site 102 may be divided into several sub-sites each having multiple libraries that store a respective set of files 104. In these configurations, the encryption on download option 118 may be configured to apply to the entire site 102 (e.g., all files 104 in every sub-site and library). Alternatively, the option 118 may be applied on a per sub-site basis or a per library basis. In this way, site owners 110 can streamline the security process while also providing granularity in which files 104 may or may not be encrypted on download.

As shown in FIG. 1A the confidential project site 102 can be accessed by various computing devices 120. A computing device 120 may be associated with a user 122 who is authorized to access the site 102 as a site owner 110, a site member 114, or a site visitor 116. In various examples, the computing device 120 can be a desktop computer, a laptop computer, mobile device, or other suitable device capable of accessing the site 102. Consider for example, a user 122 who is a site member 114 with read access to the files 104 and who wishes to work on the design doc 104A on their local computing device 120. Accordingly, the user 122 may submit a design doc download request 124. Based on the site permissions 106, which indicate that the user 122 is authorized to access the design doc 104A, the confidential project site 102 can transmit an encrypted design doc 126 to the computing device 120. As will be elaborated upon below, the encrypted design doc 126 can include the content of the design doc 104A as well as a permissions label to govern access and a tag to indicate the site 102 from which the encrypted design doc 126 originated. Once the encrypted design doc 126 is downloaded to the computing device 120, the user 122 may interact with the encrypted design doc 126 as authorized by the site permissions 106.

In another example, the user 122 may be a site visitor 116 who attempts to download the design doc 104A via a download request 124. However, the site permissions 106 may indicate that the user 122 is not authorized to access the design doc 104A. Accordingly, the confidential project site 102 can prevent the transmission of the encrypted design doc 126 to the computing device 120. In still another example, the user 122 may be a site owner 110 and submit a download request 124 for the design doc 104A. Since the site permissions 106 indicate that the user 122 is a site owner 110, the computing device 120 can be authorized to download the encrypted design doc 126 similar to a site member 114. However, the site owner 110 may additionally be enabled to remove encryption from the encrypted design doc 126. Stated another way, a site owner 110 may disable remote enforcement of site permissions 106 for downloaded copies of a file 104.

Figure 1B:
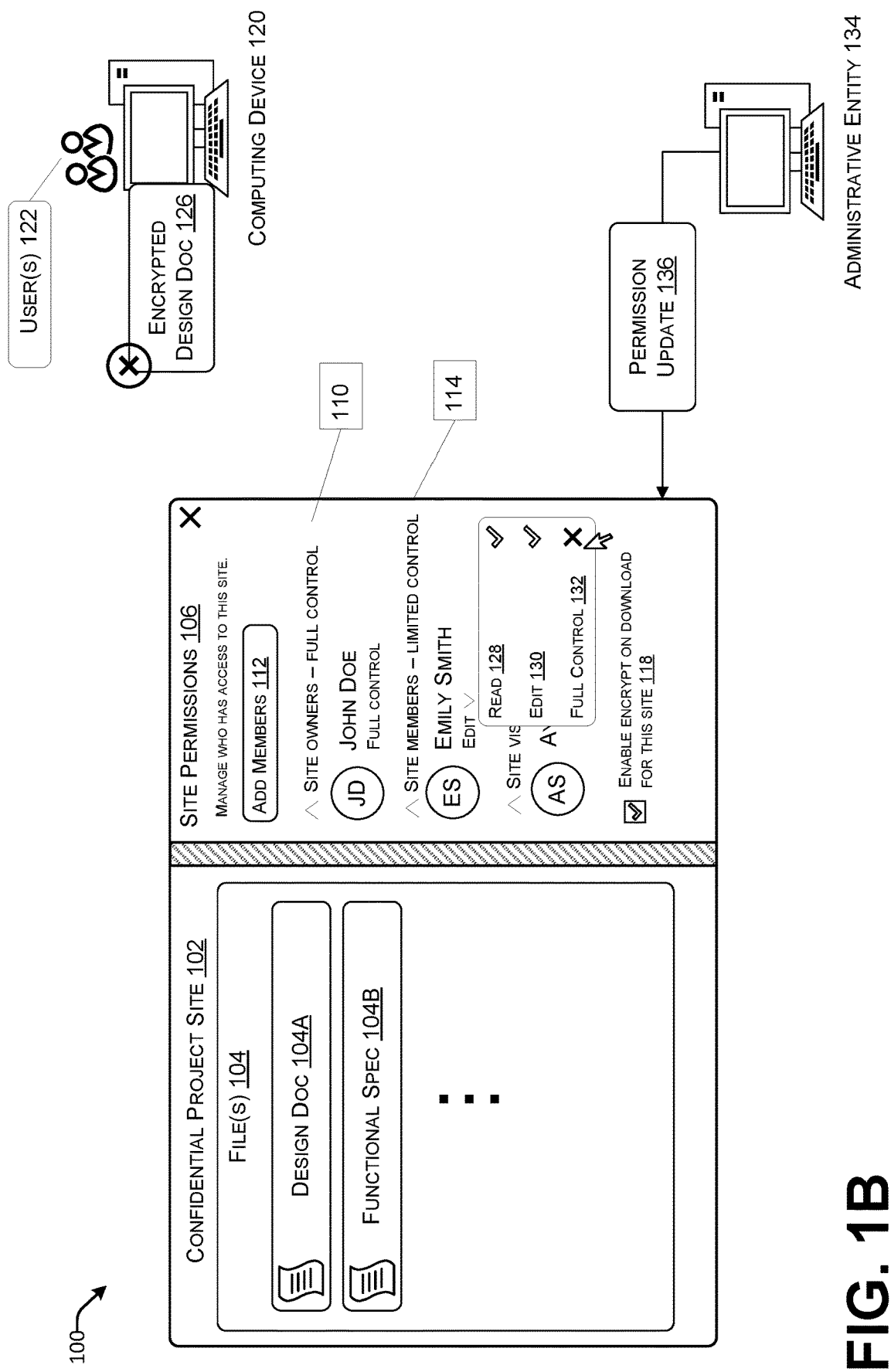
FIG. 1B illustrates the example environment in which an administrative entity revokes access to a file from a user.

Turning now to FIG. 1B, additional aspects of the environment 100 are shown and described. As discussed in one example above, a user 122 may be a site member 114 who has limited control over the files 104 of the confidential project site 102. As shown, site member 114 Emily Smith has permission to read 128 and edit 130 files 104 that are stored at the site 102. However, Emily does not have full control 132 of the site 102. For instance, Emily cannot modify site permissions 106, remove encryption, or the like. In various examples, the permissions 128-132 can be configured for individual site members 114 or for all site members 114.

In the example of FIG. 1B, the user 122 can be a site member 114 who has previously downloaded the encrypted design doc 126 as shown in FIG. 1A. However, an administrative entity 134 may generate a permission update 136 that revokes read 128 and edit 130 permissions for the user 122. For instance, upon conclusion of a project, all site members 114 may have access to the files 104 revoked. Accordingly, the encrypted design doc 126 that is stored at the computing device 120 can be updated to synchronize with the newly update site permissions 106. As such, the user 122 can no longer access the encrypted design doc 126 at the computing device 120 (as illustrated via the "X" on the encrypted design doc 126 in FIG. 1B). In another example, the administrative entity 134 may delete the confidential project site 102 following the conclusion of the project. In response, the site permissions 106 for site members 114 and site visitors 116 can be revoked. In some configurations, access to the files 104 can be optionally retained for site owners 110 following a deletion of the site 102.

Figure 2A:
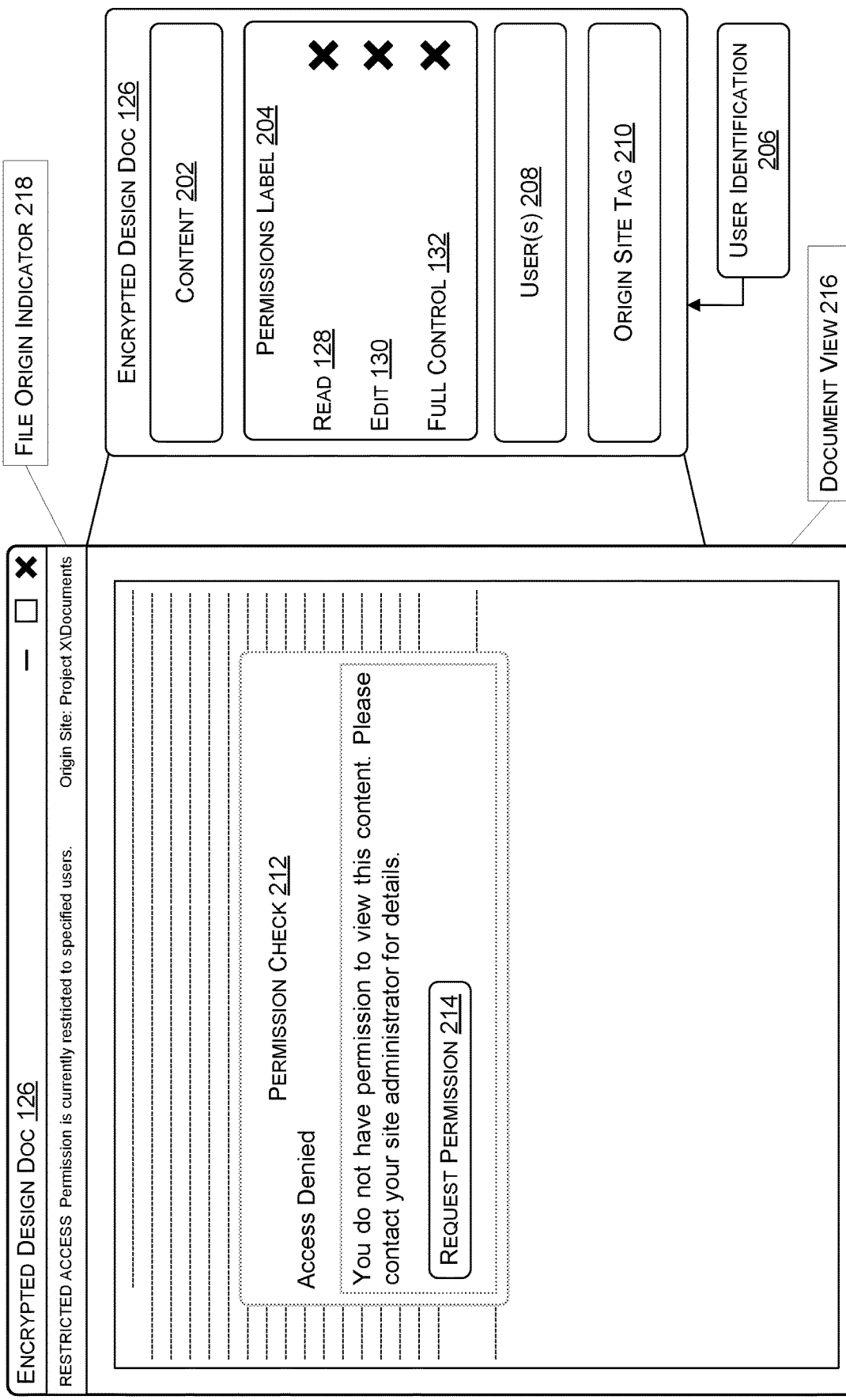
FIG. 2A illustrates an example user interface in which a user attempts to access a file for which they do not have permission.

Proceeding now to FIG. 2A, aspects of the encrypted design doc 126 are shown and described. As mentioned above, the encrypted design doc 126 can include the content 202 of the design doc 104A as well as a permissions label 204 that defines the various permissions 128-132 that are assigned to a particular user 122 that is viewing the encrypted design doc 126. In this example, the user 122 that is attempting to access the encrypted design doc 126 is determined to lack the necessary privileges as indicated by the permissions label 126. This determination can be made by comparing a user identification 206 to a list of users 208 that are authorized to interact with the encrypted design doc 126. If the received user identification 206 does not match a corresponding entry in the list of users 208 the associated user 122 can be restricted from viewing the encrypted design doc 126.

In another example, the user 208 may be an identifier associated with the specific user 122 that downloaded the encrypted design doc 126. For instance, when generating the encrypted design doc 126 for download, the confidential project site 102 may associate that copy of the design doc 104A with the user 122. In this example, the permissions label 204 is specific to a user 122 and thus cannot be transferrable between users 122. It should be understood that users 122 can be identified using any suitable method such as a serial number, an email address, an account name, and the like. The encrypted design doc 126 can also include an origin site tag 210 that indicates the original location of the encrypted design doc. In this example, the origin site is the confidential project site 102.

In addition, when attempting to access the encrypted design doc 126, the permissions label 204 can be extracted and transmitted to the site 102 to determine if the permissions label 204 is up to date with the current site permissions 106. For instance, while a user 122 may initially have read permission 120 when downloading the encrypted design doc 126, an administrative entity 134 may revoke access at a later point in time. If the permissions label 204 does not match the site permissions 106, the permissions label 204 can accordingly be updated to match the site permissions 106 prior to granting access to the encrypted design doc 126.

As shown in FIG. 2A, the permission check 212 indicates that the user 122 does not have permission to access the content 202 of the encrypted design doc 126. The permission check 212 interface can also include a selectable element 214 that enables the user 122 to contact a site owner 110 to request permission to access the encrypted design doc 126. In various examples, the permissions check 212 can be displayed within a document view 216 to provide visual indication that an attempt was made to open the encrypted design doc 126. In addition, the document view 214 can include a file origin indicator 218 that informs the user 122 as to the origin of the encrypted design doc 126. The selectable element 214 and the file origin indicator 218 can enable the user 122 to follow proper channels to gain access to the encrypted design doc 126. In addition, the file origin indicator 218 can also provide context to the user 122 as to why the encrypted design doc 126 is encrypted in a certain way. For instance, various business groups within a large organization may follow differing security practices utilizing various protocols.

Figure 2B:
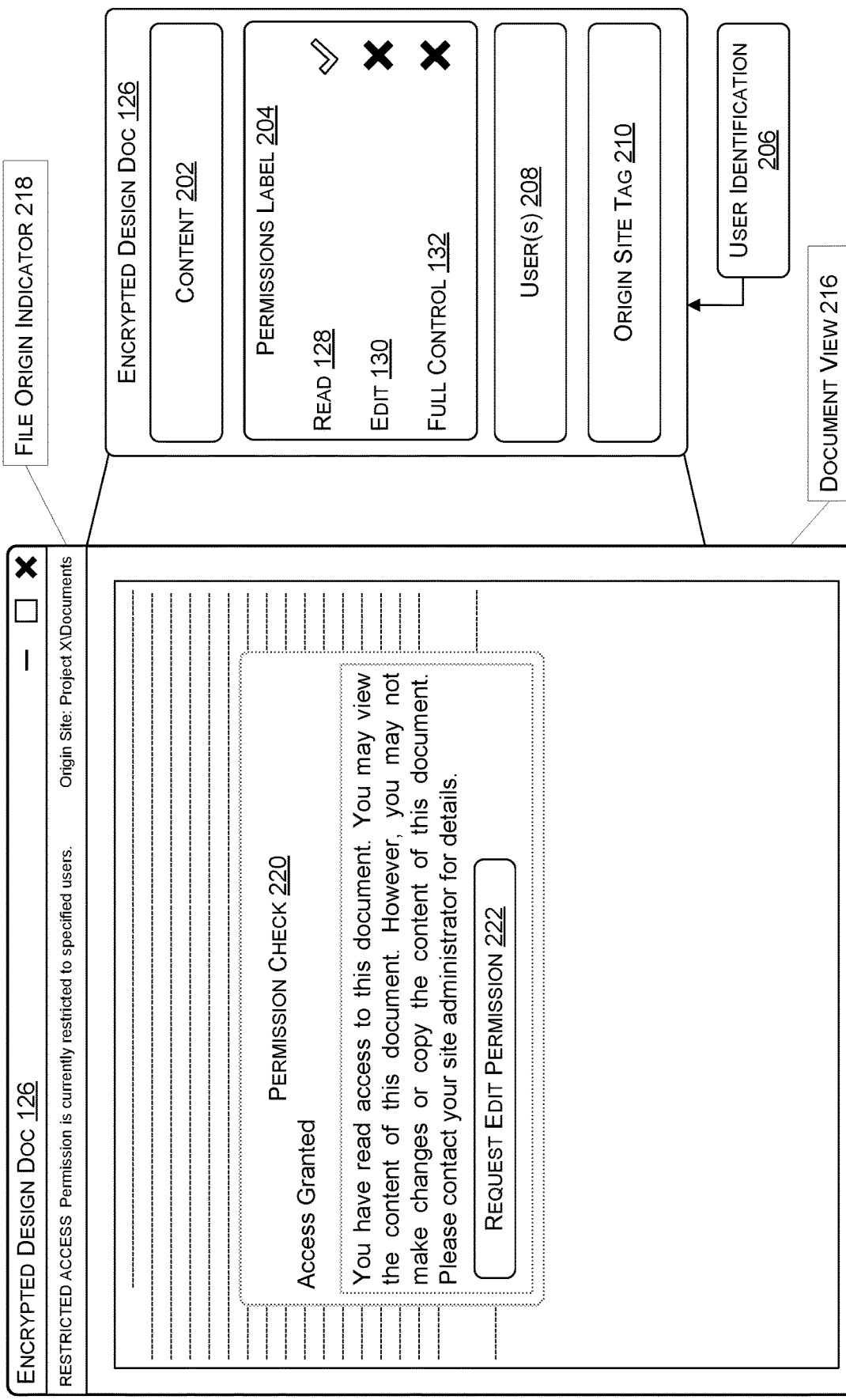
FIG. 2B illustrates an example user interface in which a user attempts to access a file for which they have partial permission.

Turning now to FIG. 2B, an alternative scenario to the example of FIG. 2A is shown and described. While the example discussed above involved a user 122 attempting to access an encrypted design doc 126 to which they had no permissions, the permissions label 204 shown here indicates that the user 122 has read 128 access to the encrypted design doc 126. Accordingly, the altered permissions label 204 can lead to an affirmative permission check 220 informing the user of their read 128 access to the encrypted design doc 126. In addition, the permission check 220 can inform the user 122 that they are restricted from modifying or copying the content of the encrypted design doc 126. However, like the example of FIG. 1A, the user 122 may request edit 130 permissions through a selectable element 222. In this way, the encrypted design doc 126 can provide context to users 122 and clearly define ways in which each user 122 may interact with various files 104.

Proceeding now to FIG. 2C, aspects of an administrative interface 224 are shown and described. In various examples, the administrative interface 224 can be used to manage permissions for a particular file 104A or a group of files 104. For instance, the administrative interface 224 can include tools for specifying a list of users 226 that are authorized to access a file 104A. In addition, users 226 can be added or removed using corresponding interface elements 228 and 230. While the illustrated example utilizes the administrative interface 224 to manage permissions for a single file 104A, it should be understood that the administrative interface 224 can also be used to alter site permissions 106. For example, in other configurations, the administrative interface 224 can be displayed within the site 102 to provide site owners 110 additional options when configuring site permissions 106.

In various examples, an administrative entity 134 can be enabled to augment the various permissions 128-132 with additional functionality. For instance, users 122 with access to the file 104A can be optionally enabled by the administrative entity 134 to print 232 the content of the file 104A. In another example, users with read 128 access to the file 104A can authorized to copy 234 the content 202. Furthermore, the administrative entity 134 can optionally enable users 122 to request additional permissions as mentioned above. In various examples, the administrative entity 134 can specify a location at which users 122 can direct requests for additional permissions. For example, requests for additional permissions may be received and processed at an email address. In other examples, requests can be directed to a web portal or other channel and automatically processed by a virtual permissions agent.

Figure 3:
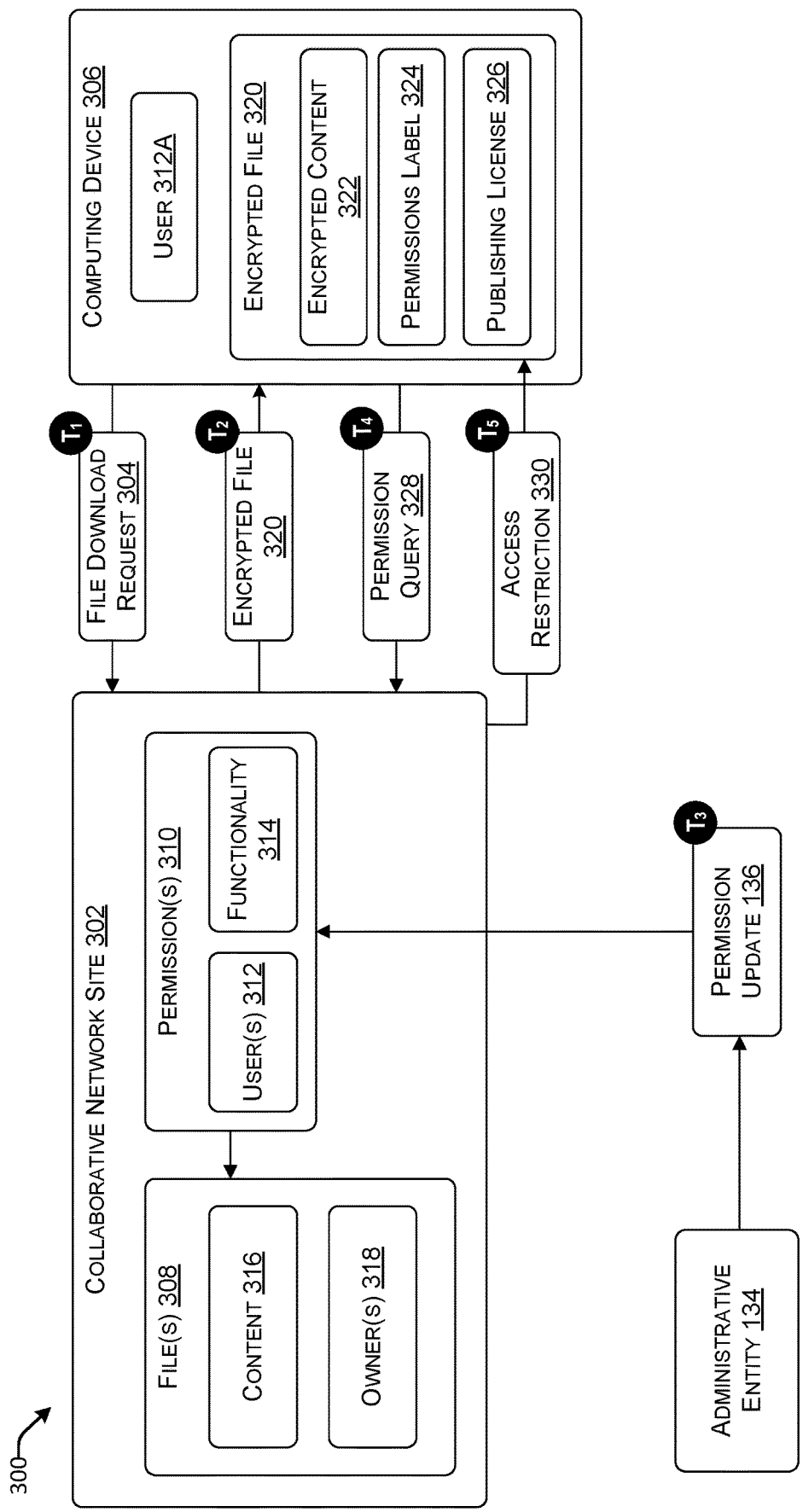
FIG. 3 is a block diagram illustrating aspects of the system for encrypting files on download and enforcing permissions for downloaded files.

Turning now to FIG. 3, aspects of an exemplary data flow scenario 300 for utilizing file encryption on download to bolster information security are shown and described. Various aspects of the data flow scenario 300 are discussed with respect to a first time $T_1$ through a fifth time $T_5$. For the purposes of the present discussion, these times represent a sequence of times in which: $T_1 < T_2 \ldots < T_N$ (where<means "prior to"). Descriptions of other exemplary data flow scenarios in relation to other figures of the present disclosure may similarly illustrate and refer to specific relative timings of various operations and/or data flows.

At time $T_1$ of the exemplary data flow scenario 300, a collaborative network site 302 receives a file download request 304 from a computing device 306 for a file 308. In various examples, the computing device 306 can be a desktop computer, a laptop computer, mobile device, or other suitable device capable of accessing the collaborative network site 302. As discussed above, the collaborative network site 302 can be created to store files 308 that are related in some way (e.g., files that are all associated with a work project). A specific example of a collaborative network site 302 is the confidential project site 102 shown and discussed above with respect to FIGS. 1A and 1B.

Upon receiving the file download request 304, the collaborative network site 302 can check the permissions 310 for a list of users 312 to determine if a user 312A associated with a requesting account and/or the computing device 306 is authorized to access the file 308. As mentioned above, users 312 can be identified using any suitable identifier such as a serial number, an email address, an account name, and so forth. In addition, the permissions 310 can define varying degrees of functionality 314 that each user 312 may access. For instance, some users 312 may be authorized to view the content 316 of the file 308 but be restricted from editing the content 316 while others may exercise full control over the file 308. Users 312 that have full control over a file 308 can be defined within the file as an owner 318. In some examples, an owner 318 can be a site owner 110 as discussed above. In other examples, an owner 318 may be the user 312 that originally created or authored the content 316 of the file 308. Accordingly, owners 318 can be defined on a per file 308 basis, portions of the collaborative network site 302, or across the entire collaborative network site 302.

The collaborative network site 302 may determine that the user 312A is authorized to access the file 308 as dictated by the permissions 310. For example, the user 312A may have access to view the content 316 but not authorized to edit or otherwise modify the file 308. Accordingly, the collaborative network site 302 can transmit an encrypted file 320 at time $T_2$. The encrypted file 320 can include encrypted content 322 which can be the content 316 that is encrypted using any suitable method or algorithm. In addition, the encrypted file 320 can include a permissions label 324 that may be enabled to synchronize with the permissions 310 and can define various privileges assigned to the user 312A. A specific example of the permissions label 324 is shown and described above with respect to FIGS. 2A and 2B in which the permissions label 204 defines a read 128, edit 130, and full control 132 permission. However, it should be understood that the permissions label 324 can define any type of quantity of functionality 314 that is available to various users 312 for interacting with a file 308.

The encrypted file 320 can further include a publishing license 326 that can contain metadata defining various characteristics of the encrypted file 320. For instance, the publishing license 326 can indicate the original location of the encrypted file 320 such as the collaborative network site 302. The publishing license 326 can also identify the owner 318 of the original file 308 or other users 312 that are authorized to access the encrypted file 320. The publishing license 326 can accordingly be utilized to query the correct source when determining whether the user 312A is authorized to access the encrypted file 320. In addition, the publishing license 326 can enable the user 312A to query the proper channels an obtain various permissions 310 should they require them.

Subsequently at time $T_3$, an administrative entity 134 may execute a permission update 136 that modifies the permissions 310. For instance, the permission update 136 may revoke access to the file 308 from the user 312A. In a specific example, the user 312A may lose access to a specific file 308. Alternatively, the user 312A may be removed from the collaborative network site 302 entirely. In another example, the permission update 136 may only partially revoke access for the user 312A (e.g., the user 312A may no longer edit the file 308 but may still read).

At a later point in time $T_4$, the user 312A may attempt to open the encrypted file 320. Accordingly, a permission query 328 can be generated and transmitted to the collaborative network site 302. In various examples, the permission query 328 can include information extracted from the permissions label 324, the publishing license 326, or a combination of both. For instance, the location of the collaborative network site 302 can be extracted from the publishing license 326 while a list of permissions can be extracted from the permissions label 324 to form the permission query 328. The permission query 328 can be checked against the permissions 310 at the collaborative network site 302 and access to the encrypted file 320 can be granted or denied based on the check.

In the present example scenario 300, the check of the permission query 328 against the permission 310 can indicate that the user 312A is not to be granted access to the encrypted file 320. This may be the result of the permission update 136 that was previously executed by the administrative entity 134 that revoked access for the user 312A. As such, at time $T_5$, the collaborative network site 302 can apply an access restriction 330 to the encrypted file 320 that prevents the user 312A from viewing, modifying, or otherwise interacting with the encrypted file 320. In another example, the permission update 136 may partially revoke the access for the user 312A such as revoking edit permission but not read permission. Accordingly, the access restriction 330 may simply prevent the user 312A from modifying the encrypted file 320 while still allowing the user 312A to view the encrypted content 322. In general, it should be understood that the degree of the access restriction 330 can be proportionate to the results of the comparison between the permission query 328 and the permissions 310.

In an alternative example, the encrypted file 320 that is downloaded by the computing device 306 may be configured to omit the encrypted content 322. Instead, the computing device 306 merely receives an encrypted file 320 that includes a permissions label 324 and a publishing license 326. When the user 312A attempts to access the encrypted file 320, the permission query 328 is generated and analyzed by the collaborative network stie 302 as discussed above. If the user 312A is granted access to the encrypted file, the content 316 may then be transmitted to the computing device 306 to be accessed by the user 312A according to their assigned privileges.

Figure 4:
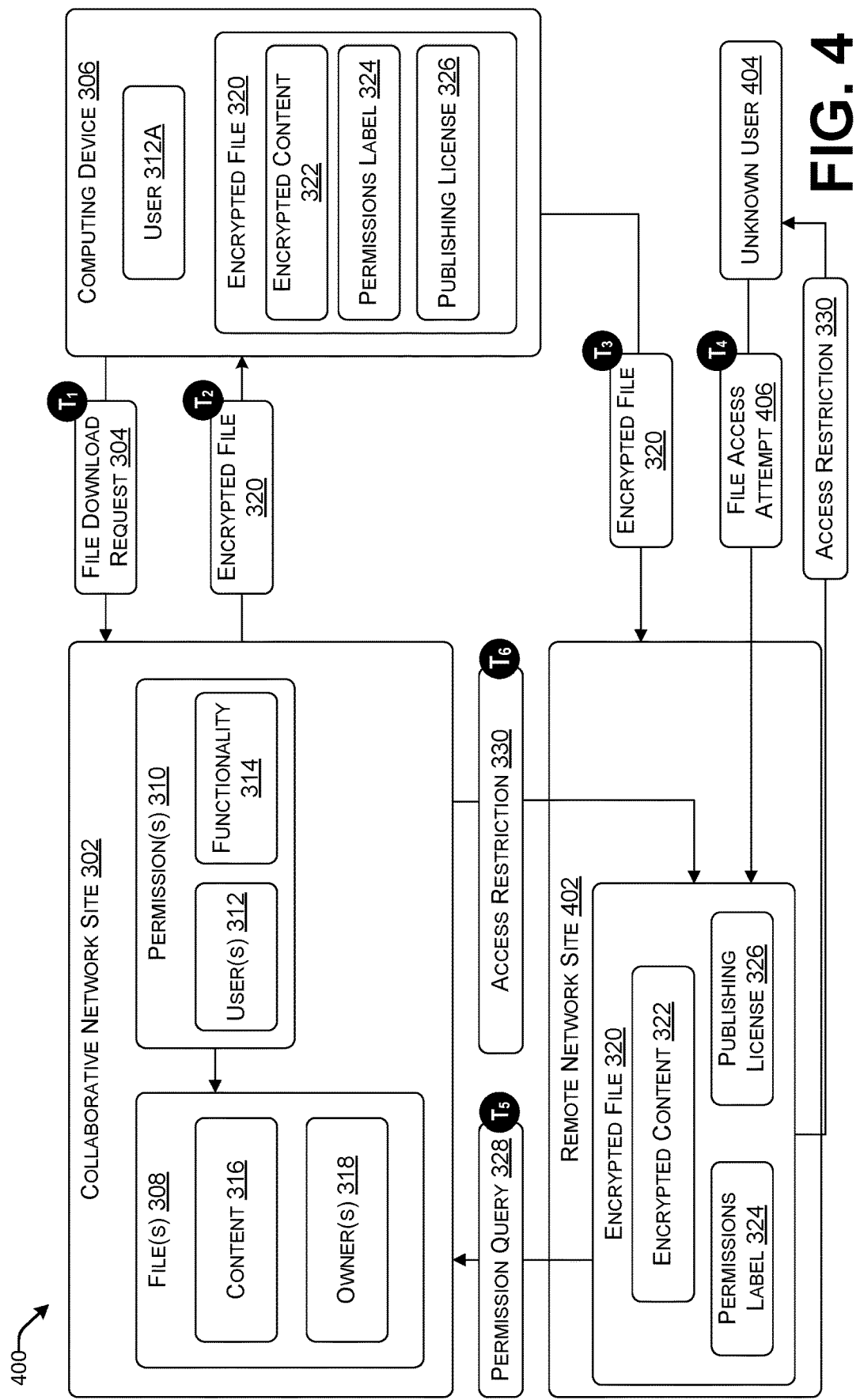
FIG. 4 is a block diagram illustrating additional aspects of the system for encrypting files on download and enforcing permissions for downloaded files.

Proceeding now to FIG. 4, aspects of another exemplary data flow scenario 400 in which a file is downloaded from a collaborative network site 302 and uploaded to a remote network site 402 are shown and described. Various aspects of the data flow scenario 400 are discussed with respect to a first time $T_1$ through a sixth time $T_6$. Similar to the example of FIG. 3, a collaborative network site 302 can receive a file download request 304 at time $T_1$. After ensuring that the user 312A is authorized to access the file 308, an encrypted file 320 can be transmitted to the computing device 306 at time $T_2$.

Subsequently, at time $T_3$, the user 312A may elect to upload the encrypted file 320 to a remote network site 402 that is separate from the collaborative network site 302. For instance, the remote network site 402 may be a separate network location that utilizes the same file storage platform and thus the same computing infrastructure. In another example, the remote network site 402 may be a site on a different file storage platform with differing infrastructure. Irrespective of the configuration or infrastructure of the remote network site 402, the encrypted file 320 can maintain the encrypted content 322 as well as the permissions label 324 and the publishing license 326. In this way, the integrity and information security of the encrypted file 320 can remain uncompromised despite egressing the original collaborative network site 302. In another example, the user 312A may attempt to transfer the encrypted file 320 through physical media such as a thumb drive rather than through a network. In this example, the remote network site 402 may be a computing device that is different from the computing device 306. Nonetheless, the encrypted file can still include the encrypted content 322, the permissions label 324, and the publishing license 326 to prevent unauthorized access to the encrypted file 320.

Later, at time $T_4$, an unknown user 404 of the remote network site 402 may attempt to access 406 the encrypted file 320. In various examples, the access attempt 404 can include attempting to open, copy, or otherwise interact with the encrypted file 320. Accordingly, at time $T_5$, the encrypted file 320 can generate a permission query 328 as discussed above that can be transmitted to the original location of the encrypted file at the collaborative network site 302. In this example, the permission query 328 can include an identifier for the unknown user 404. When comparing the permission query 328 against the permissions 310, the collaborative network site 302 may determine that the unknown user 404 is not among the list of users 312 that are authorized to view the encrypted file 320. At time $T_6$ an access restriction 330 can be applied to the encrypted file 320 at the remote network site 402 to prevent unauthorized access to the encrypted file 320. In this way, access to copies of the file 308 such as the encrypted file 320 is restricted to users 312 who are explicitly authorized by the permissions label 324 and/or the publishing license 326. In addition, the access restriction 330 may be propagated to the unknown user 404 to prevent further unauthorized access attempts 406.

Figure 5:
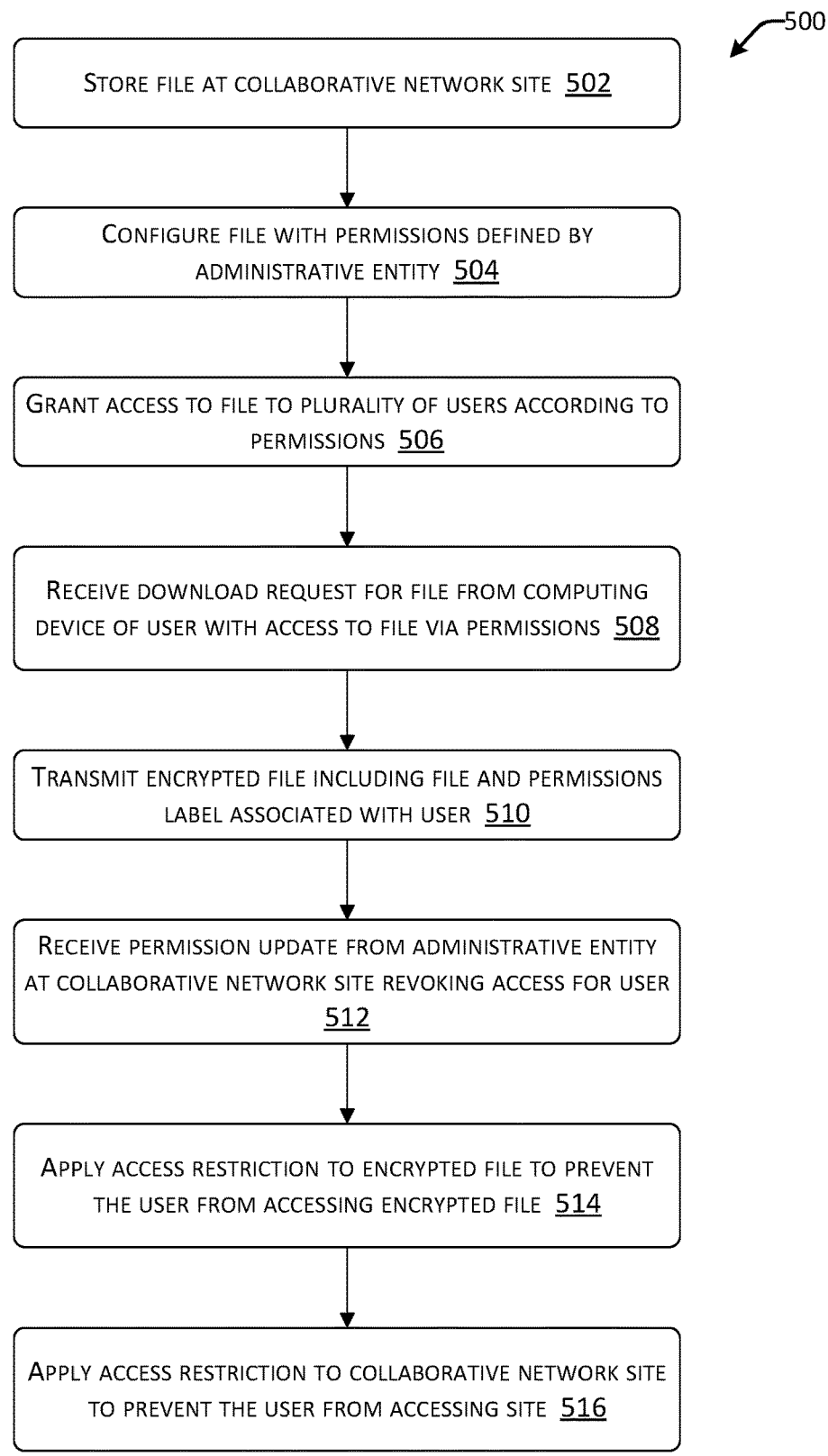
FIG. 5 is a flow diagram showing aspects of a routine for utilizing the network effect of end-user viral adoption of services and applications by clustering users based on characteristics of requests to configure new tenants.

Turning now to FIG. 5, aspects of a routine 500 for enabling enhanced information security in file storage systems through file encryption on download are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, routine 500 begins at operation 502 where a system stores a file at a collaborative network site.

Next, at operation 504, the system configures the file with permissions that are defined by an administrative entity.

At operation 506, access to the file is accordingly granted to a plurality of users based on the configured permissions.

Then, at operation 508, the system receives a download request for the file from a computing device that is associated with a user of the plurality of users with access to the file via the permissions.

At operation 510, the system transmits an encrypted file including the file itself as well as a permissions label that is associated with the user that requested the download.

Next, operation 512, the system receives a permission update from the administrative entity revoking access to the file from the user who downloaded the encrypted file.

Then, at operation 514, the system applies an access restriction to the encrypted file to prevent access to the file by the user.

Finally, at operation 516, the system applies another access restriction to the collaborative network site to prevent the user from accessing the site in addition to the encrypted file.

Figure 6:
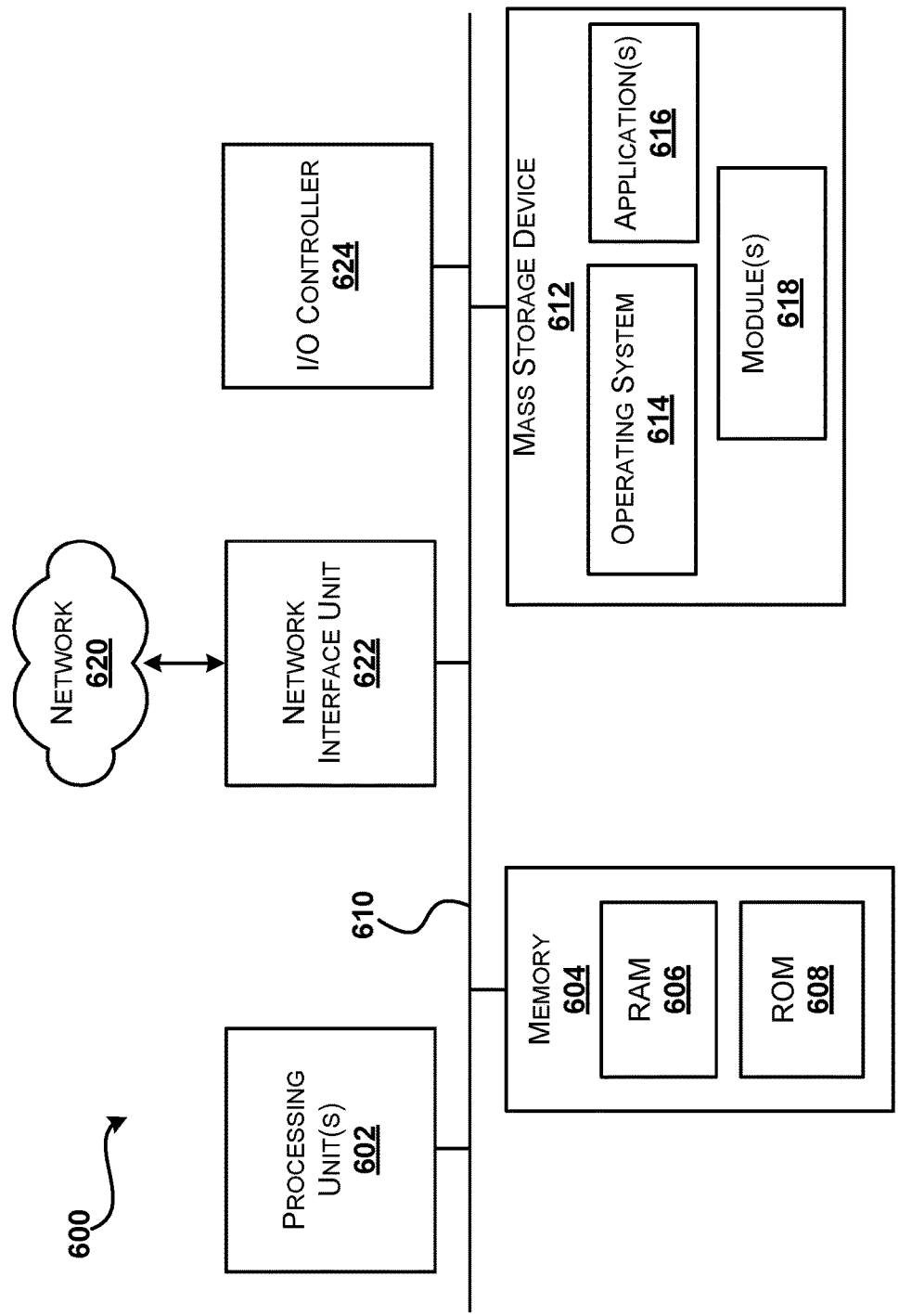
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (AS SPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 702 transition between states, thereby transforming the transistors or other discrete hardware elements constituting the processing unit (s) 602.

Figure 7:
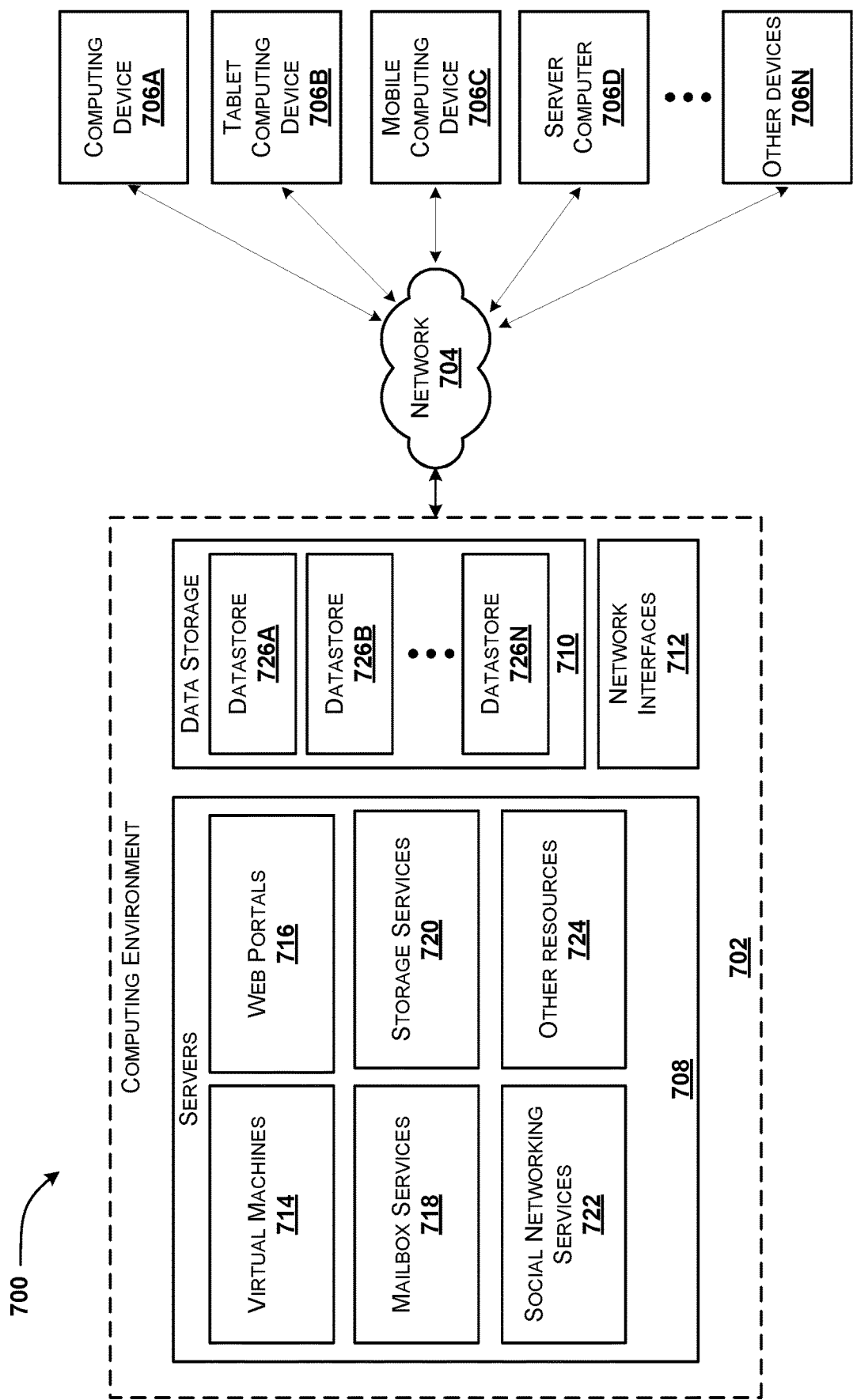
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B;

a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or, social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: storing a file at a collaborative network site; configuring, by one or more processing units, the file with one or more permissions defined by an administrative entity; granting a plurality of users access to the file according to the one or more permissions; receiving a download request for the file from a computing device associated with a user of the plurality of users; transmitting an encrypted file comprising the file and a permissions label associated with the user to the computing device in response to receiving the download request; receiving a permission update at the collaborative network site from the administrative entity revoking access to the file for the user; and in response to the revocation of access to the file, applying an access restriction to the encrypted file to prevent access to the file by the user.

Example Clause B, the method of example clause A, wherein the encrypted file includes a publishing license comprising data defining an original collaborative network site of the encrypted file, the publishing license configured to implement a synchronization between the permissions label in the encrypted file and the one or more permissions configured for the file at the collaborative network site.

Example Clause C, the method of Example Clause A or Example Clause B, wherein the permissions label includes one or more of a read permission, an edit permission, or a full control permission for the user.

Example Clause D, the method of any one of Example Clause A through C, further comprising: deleting the collaborative network site in response to a deletion command from the administrative entity; and revoking access to the file for the plurality of users in response to the deletion of the collaborative network site.

Example Clause E, the method of any one of Example Clause A through D, further comprising: detecting that the encrypted file is uploaded to another collaborative network site; and in response to detecting that the encrypted file is uploaded to the other collaborative network site, preventing access to the encrypted file by one or more users that are not associated with the one or more permissions.

Example Clause F, the method of any one of Example Clause A through E, further comprising: receiving an access request from the computing device of the user to access the encrypted file, wherein the access request includes one or more permissions extracted from the permissions label included in the encrypted file previously transmitted to the computing device; comparing the one or more extracted permissions from the encrypted file to the one or more permissions configured for the file at the collaborative network site; detecting a mismatch between the one or more extracted permissions from the encrypted file and the one or more permissions configured for the file at the collaborative network site; and restricting access to the encrypted file for the user in response to detecting the mismatch.

Example Clause G, the method of Example Clause F, wherein the permission update modifies the one or more permissions configured for the file at the collaborative network site, the modification of the one or more permissions configured for the file at the collaborative network site causing the mismatch between the one or more extracted permissions from the encrypted file and the one or more permissions configured for the file at the collaborative network site.

Example Clause H, a system comprising: one or more processing units; and a computer-readable medium having encoded thereon computer-readable instructions that when executed by the one or more processing units causes the system to: store a file at a collaborative network site; configure the file with one or more permissions defined by an administrative entity; grant a plurality of users access to the file according to the one or more permissions; receive a download request for the file from a computing device associated with a user of the plurality of users; transmit an encrypted file comprising the file and a permissions label associated with the user to the computing device in response to receiving the download request; receive a permission update at the collaborative network site from the administrative entity revoking access to the file for the user; and in response to the revocation of access to the file, apply an access restriction to the encrypted file to prevent access to the file by the user.

Example Clause I, the system of Example Clause H, wherein the encrypted file includes a publishing license comprising data defining an original collaborative network site of the encrypted file, the publishing license configured to implement a synchronization between the permissions label in the encrypted file and the one or more permissions configured for the file at the collaborative network site.

Example Clause J, the system of Example Clause H or Example Clause I, wherein the permissions label includes one or more of a read permission, an edit permission, or a full control permission for the user.

Example Clause K, the system of any one of Example Clause H through J, wherein the computer-readable instructions further cause the system to: delete the collaborative network site in response to a deletion command from the administrative entity; and revoke access to the file for the plurality of users in response to the deletion of the collaborative network site.

Example Clause L, the system of any one of Example Clause H through K, wherein the computer-readable instructions further cause the system to: detect that the encrypted file is uploaded to another collaborative network site; and in response to detecting that the encrypted file is uploaded to the other collaborative network site, prevent access to the encrypted file by one or more users that are not associated with the one or more permissions.

Example Clause M, the system of any one of Example Clause H through L, wherein the computer-readable instructions further cause the system to: receive an access request from the computing device of the user to access the encrypted file, wherein the access request includes one or more permissions extracted from the permissions label included in the encrypted file previously transmitted to the computing device; compare the one or more extracted permissions from the encrypted file to the one or more permissions configured for the file at the collaborative network site; detect a mismatch between the one or more extracted permissions from the encrypted file and the one or more permissions configured for the file at the collaborative network site; and restrict access to the encrypted file for the user in response to detecting the mismatch.

Example Clause N, the system of Example Clause M, wherein the permission update modifies the one or more permissions configured for the file at the collaborative network site, the modification of the one or more permissions configured for the file at the collaborative network site causing the mismatch between the one or more extracted permissions from the encrypted file and the one or more permissions configured for the file at the collaborative network site.

Example Clause O, a computer-readable storage medium having encoded thereon, computer-readable instructions that when executed by one or more processing units cause a system to: store a file at a collaborative network site; configure the file with one or more permissions defined by an administrative entity; grant a plurality of users access to the file according to the one or more permissions; receive a download request for the file from a computing device associated with a user of the plurality of users; transmit an encrypted file comprising the file and a permissions label associated with the user to the computing device in response to receiving the download request; receive a permission update at the collaborative network site from the administrative entity revoking access to the file for the user; and in response to the revocation of access to the file, apply an access restriction to the encrypted file to prevent access to the file by the user.

Example Clause P, the computer-readable storage medium of Example Clause O, wherein the encrypted file includes a publishing license comprising data defining an original collaborative network site of the encrypted file, the publishing license configured to implement a synchronization between the permissions label in the encrypted file and the one or more permissions configured for the file at the collaborative network site.

Example Clause Q, the computer-readable storage medium of Example Clause O or Example Clause P, wherein the permissions label includes one or more of a read permission, an edit permission, or a full control permission for the user.

Example Clause R, the computer-readable storage medium of any one of Example Clause O through Q wherein the computer-readable instructions further cause the system to: detect that the encrypted file is uploaded to another collaborative network site; and in response to detecting that the encrypted file is uploaded to the other collaborative network site, prevent access to the encrypted file by one or more users that are not associated with the one or more permissions.

Example Clause S, the computer-readable storage medium of any one of Example Clause O through R wherein the computer-readable instructions further cause the system to: receive an access request from the computing device of the user to access the encrypted file, wherein the access request includes one or more permissions extracted from the permissions label included in the encrypted file previously transmitted to the computing device; compare the one or more extracted permissions from the encrypted file to the one or more permissions configured for the file at the collaborative network site; detect a mismatch between the one or more extracted permissions from the encrypted file and the one or more permissions configured for the file at the collaborative network site; and restrict access to the encrypted file for the user in response to detecting the mismatch.

Example Clause T, the computer-readable storage medium of Example Clause S, wherein the permission update modifies the one or more permissions configured for the file at the collaborative network site, the modification of the one or more permissions configured for the file at the collaborative network site causing the mismatch between the one or more extracted permissions from the encrypted file and the one or more permissions configured for the file at the collaborative network site.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different files).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
    one or more processing units; and
    a computer-readable medium having encoded thereon computer-readable instructions that when executed by the one or more processing units causes the system to:
    store a file at a collaborative network site;
    configure the file with one or more permissions defined by an administrative entity associated with the collaborative network site;
    grant a plurality of users access to the file according to the one or more permissions;
    receive a download request for the file from a computing device associated with a user of the plurality of users;
    transmit an encrypted file comprising the file and a permissions label associated with the user to the computing device in response to receiving the download request;
    receive, from another collaborative network site, a permissions query that includes an identification for another user requesting to download the encrypted file which has been uploaded to the other collaborative network site;
    compare the identification for the other user to the one or more permissions for which the file is configured;
    determine, based on the comparing, that the other user is not included in the plurality of users that have been granted access to the file; and
    prevent access to the encrypted file for the other user based on the determining.

2. The system of claim 1, wherein the encrypted file includes a publishing license comprising data defining the collaborative network site of the encrypted file, the publishing license configured to implement a synchronization between the permissions label in the encrypted file and the one or more permissions configured for the file at the collaborative network site.

3. The system of claim 1, wherein the permissions label includes one or more of a read permission, an edit permission, or a full control permission for the user.

4. The system of claim 1, wherein the computer-readable instructions further cause the system to:
    delete the collaborative network site in response to a deletion command from the administrative entity; and
    revoke access to the file for the plurality of users in response to the deletion of the collaborative network site.

5. The system of claim 1, wherein the computer-readable instructions further cause the system to:
    receive an access request from the computing device of the user to access the encrypted file, wherein the access request includes one or more permissions extracted from the permissions label included in the encrypted file previously transmitted to the computing device;
    compare the one or more extracted permissions from the encrypted file to the one or more permissions configured for the file at the collaborative network site;
    detect a mismatch between the one or more extracted permissions from the encrypted file and the one or more permissions configured for the file at the collaborative network site; and
    restrict access to the encrypted file for the user in response to detecting the mismatch.

6. The system of claim 5, wherein a permission update modifies the one or more permissions configured for the file at the collaborative network site, the modification of the one or more permissions configured for the file at the collaborative network site causing the mismatch between the one or more extracted permissions from the encrypted file and the one or more permissions configured for the file at the collaborative network site.

7. A computer-readable storage medium having encoded thereon, computer-readable instructions that when executed by one or more processing units cause a system to:
    store a file at a collaborative network site;
    configure the file with one or more permissions defined by an administrative entity associated with the collaborative network site;
    grant a plurality of users access to the file according to the one or more permissions;
    receive a download request for the file from a computing device associated with a user of the plurality of users;
    transmit an encrypted file comprising the file and a permissions label associated with the user to the computing device in response to receiving the download request;
    receive, from another collaborative network site, a permissions query that includes an identification for another user requesting to download the encrypted file which has been uploaded to the other collaborative network site;
    compare the identification for the other user to the one or more permissions for which the file is configured;
    determine, based on the comparing, that the other user is not included in the plurality of users that have been granted access to the file; and
    prevent access to the encrypted file for the other user based on the determining.

8. The computer-readable storage medium of claim 7, wherein the encrypted file includes a publishing license comprising data defining the collaborative network site of the encrypted file, the publishing license configured to implement a synchronization between the permissions label in the encrypted file and the one or more permissions configured for the file at the collaborative network site.

9. The computer-readable storage medium of claim 7, wherein the permissions label includes one or more of a read permission, an edit permission, or a full control permission for the user.

10. The computer-readable storage medium of claim 7, wherein the computer-readable instructions further cause the system to:
- receive an access request from the computing device of the user to access the encrypted file, wherein the access request includes one or more permissions extracted from the permissions label included in the encrypted file previously transmitted to the computing device;
- compare the one or more extracted permissions from the encrypted file to the one or more permissions configured for the file at the collaborative network site;
- detect a mismatch between the one or more extracted permissions from the encrypted file and the one or more permissions configured for the file at the collaborative network site; and
- restrict access to the encrypted file for the user in response to detecting the mismatch.

11. The computer-readable storage medium of claim 10, wherein a permission update modifies the one or more permissions configured for the file at the collaborative network site, the modification of the one or more permissions configured for the file at the collaborative network site causing the mismatch between the one or more extracted permissions from the encrypted file and the one or more permissions configured for the file at the collaborative network site.

12. A method comprising:
- storing a file at a collaborative network site;
- configuring the file with one or more permissions defined by an administrative entity associated with the collaborative network site;
- granting a plurality of users access to the file according to the one or more permissions;
- receiving a download request for the file from a computing device associated with a user of the plurality of users;
- transmitting an encrypted file comprising the file and a permissions label associated with the user to the computing device in response to receiving the download request;
- receiving, from another collaborative network site, a permissions query that includes an identification for another user requesting to download the encrypted file which has been uploaded to the other collaborative network site;
- comparing the identification for the other user to the one or more permissions for which the file is configured;
- determining, based on the comparing, that the other user is not included in the plurality of users that have been granted access to the file; and
- preventing access to the encrypted file for the other user based on the determining.

13. The method of claim 12, wherein the encrypted file includes a publishing license comprising data defining the collaborative network site of the encrypted file, the publishing license configured to implement a synchronization between the permissions label in the encrypted file and the one or more permissions configured for the file at the collaborative network site.

14. The method of claim 12, wherein the permissions label includes one or more of a read permission, an edit permission, or a full control permission for the user.

15. The method of claim 12, further comprising:
- deleting the collaborative network site in response to a deletion command from the administrative entity; and
- revoking access to the file for the plurality of users in response to the deletion of the collaborative network site.

16. The method of claim 12, further comprising:
- receiving an access request from the computing device of the user to access the encrypted file, wherein the access request includes one or more permissions extracted from the permissions label included in the encrypted file previously transmitted to the computing device;
- comparing the one or more extracted permissions from the encrypted file to the one or more permissions configured for the file at the collaborative network site;
- detecting a mismatch between the one or more extracted permissions from the encrypted file and the one or more permissions configured for the file at the collaborative network site; and
- restricting access to the encrypted file for the user in response to detecting the mismatch.

17. The method of claim 16, wherein a permission update modifies the one or more permissions configured for the file at the collaborative network site, the modification of the one or more permissions configured for the file at the collaborative network site causing the mismatch between the one or more extracted permissions from the encrypted file and the one or more permissions configured for the file at the collaborative network site.

* * * * *